May 29, 1945.  O. C. KAVLE  2,377,241
GEAR LAPPING MACHINE
Filed July 14, 1942
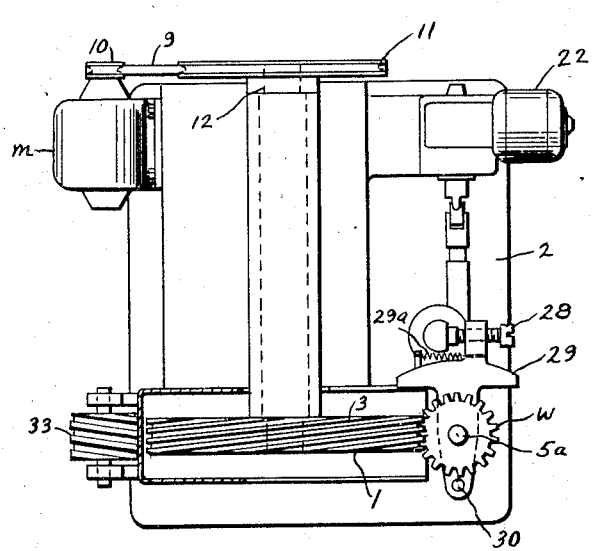
FIG. 1
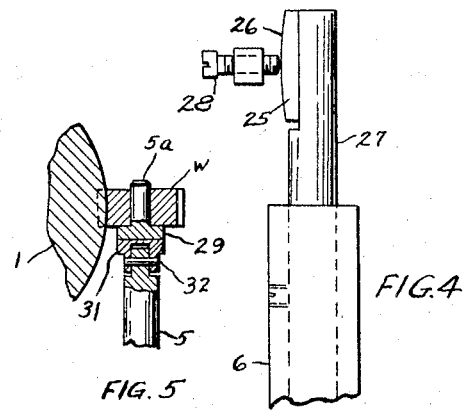
FIG. 5
FIG. 4
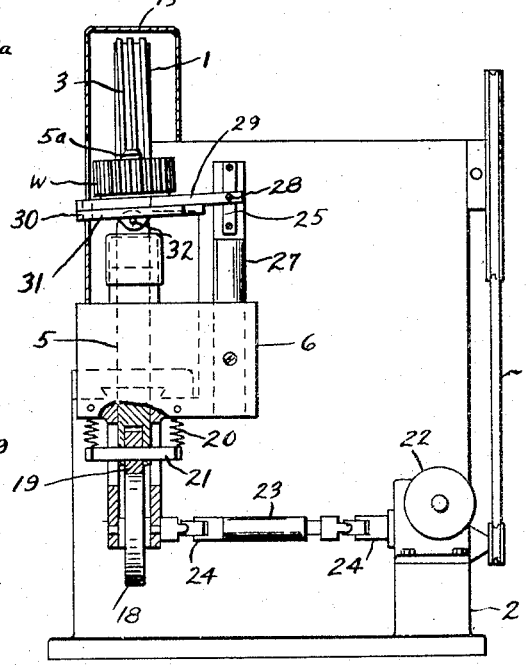
FIG. 3
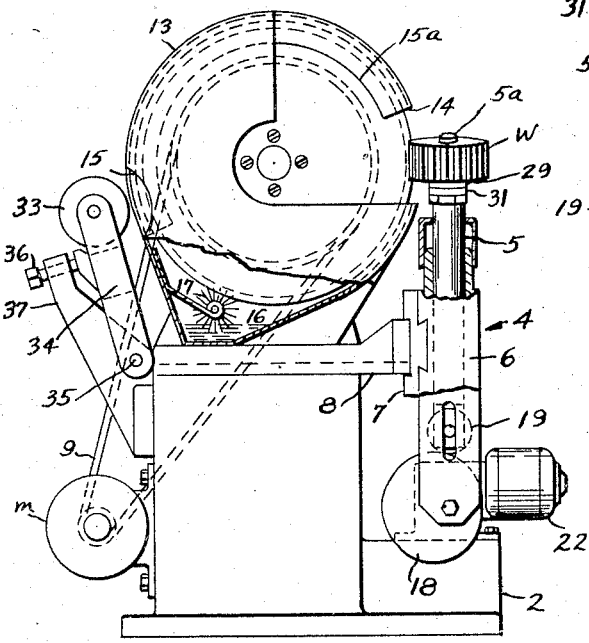
FIG. 2
INVENTOR.
O. C. Kavle
BY Bodell & Thompson
ATTORNEYS.

Patented May 29, 1945

2,377,241

UNITED STATES PATENT OFFICE 2,377,241

GEAR LAPPING MACHINE

Oscar C. Kavle, Syracuse, N. Y., assignor to The Kavle-Head Corporation, Ithaca, N. Y., a corporation of New York Application July 14, 1942, Serial No. 450,831

5 Claims. (Cl. 51—94)

This invention relates to gear lapping machines, and has for its object a machine in which the tool or abrading wheel is formed with a toothed peripheral working face of a conformable material, as for instance, lead, with means for reforming the teeth in their original form, when deformed, by reason of their coaction with the teeth of the work gear.

The invention further has for its object a reciprocating work gear carriage, and means for alternately imparting to the work gear and releasing the same from a slight pressure toward and from the abrading wheel during the reciprocation, so that the addendum and dedendum faces thereof have a very slight arcuate form from end to end to provide slight clearances at the ends of the teeth, but leaving the intermediate portion between the ends of such slight arc as to be practically a straight line.

The invention consists in the novel features and in the combinations and constructions hereinafter set forth and claimed.

In describing this invention, reference is had to the accompanying drawing in which like characters designate corresponding parts in all the views.

Figure 1 is a plan view illustrative of a machine embodying this invention.

Figure 2 is an elevation of parts seen in Figure 1.

Figure 3 is an elevation, partly in section, looking to the left in Figure 2.

Figure 4 is an enlarged fragmentary view of the means for giving an arcuate movement to the work gear carriage.

Figure 5 is a fragmentary sectional view through the work gear mounting and contiguous parts.

1 designates the tool or abrading wheel rotatably mounted in a suitable frame 2, this wheel being shown as having a peripheral working face. The working face is of relative soft or conformable material, as lead, and is formed with spiral or inclined teeth 3. As here shown, the wheel is shown as provided with four spiral teeth extending in a general circumferential direction.

4 designates, generally, the carriage for the work gear or the gear being lapped. It is here shown as including an upright spindle 5 mounted for reciprocating movement in block 6 adjustable parallel to the axis of the abrading wheel, which in turn is mounted on a vertically adjustable block 7 movable in vertical ways on a third block 8 adjustable crosswise of the axis of the abrading wheel. The work gear W is mounted on a stud or spindle 5ª carried at the upper end of the spindle 5. The tool or abrading wheel is actuated in any suitable manner, as from a motor M through suitable motion transmitting means, as a belt 9 running over a pulley 10 on the motor shaft, and over the pulley 11 on the shaft 12 on which the wheel 1 is mounted. The wheel 1 may be enclosed in a suitable casing 13 having openings at 14 and 15 therein, where the wheel engages the work gear W and a forming wheel to be presently described. The openings 14, 15 may be closed by a sliding cover 15ª in the casing operable to close the openings 15 when the opening 14 is open, and vice-versa.

The casing may be so formed as to form a sump 16 for oil, which may contain an abrasive. The oil is applied to the wheel during rotation thereof by a rotating spring-pressed wiper or brush 17 dipping into the oil and coacting with the periphery of the wheel 1.

The work spindle 5 may be reciprocated in any suitable manner, as by a cam 18 supported between the downward bifurcated extensions of the carriage block 6, this cam coacting with a follower or roller 19 on the lower end of the spindle 5. The cam is of the uniform motion lift type acting to move the spindle upwardly in one direction against the returning action of the weight of the spindle and work gear. Springs 20 are used to relieve the cam of the weight of the spindle and gear. These springs 20 are shown as tension springs acting on the axle pin 21 for the follower or roller 19, which pin extends through slots in the bifurcations of the carriage block 6. The cam is actuated in any suitable manner, here shown as by an electric motor 22 suitably carried by the frame. The motion is transmitted from the motor shaft to the cam 18 through telescoping sections of a propeller shaft 23, which includes universal joints 24, the universal joints permitting the cam to be actuated in any vertical or horizontal adjustment of the carriage 4.

The gear W is given a slight arcuate movement during the reciprocation thereof to form slight clearances at the ends of the gear on the addendum and dedendum faces of the gear teeth, by a stationary cam 25 having a slight arcuate face 26. This cam is supported upon an upright post 27 carried by the block 6 extending parallel to the spindle 5. It coacts with an adjustable follower or screw 28 on a motion transmitting member, as a lever, by which an alternate lateral pressure and release is transmitted to the work gear to alternately press the same radially toward the periphery by spring 29ª of the abrading wheel, and release the gear. The spring 29ª causes the follower 28 to follow the cam 25. This motion transmitting member is here shown as a lever 29 pivoted at 30 at a point radial relatively to the axis of the gear to a support or shelf 31 which is secured to the spindle 5 by a transverse pivot 32. The lever overlies this shelf. The stud or spindle 5ª extends upward from the lever. The gear rests upon the lever 29. Thus, during the reciprocation of the spindle 5 by the cam 18, the follower 28 on the lever 29 follows the arcuate curve 26 of the cam 25 and imparts a very slight horizontal swinging movement to the lever 29 about its pivot 30, and this imparts an alternate pressure and release of pressure to the work gear W in a direction radially relatively to the abrading wheel 1. This slight movement effected by the arcuate surface 26 is sufficient to provide small clearances on the gear teeth ends.

At the beginning of the lapping operation on a new gear, the follower 28 is usually held off the cam 25, as for instance, by the tops of the gear teeth bottoming in the spaces between the teeth of the abrading wheel, or vice-versa. As the gear approaches finished condition and tops of its teeth and also the bottoms of the spaces between gear teeth wear down, the spring 29ª, which is under light tension, shifts the lever 29 to bring the follower 28 onto the arcuate surface of the cam 25. The intermediate part of the cam is nearly flat. The portions back off or recede and hence during the reciprocation of the work gear, the ends of the addendum and dedendum faces are backed off.

During the lapping operation, the teeth 3 of the tool or abrading wheel become deformed. Means is provided for reforming them as often as necessary. The means here shown consists of a forming wheel 33 mounted on the frame to be shifted into and out of engagement with the periphery of the wheel 1. The forming wheel 33 is of relatively hard material or metal and formed with spiral teeth. When shifted into engagement with the wheel 1 and while the wheel 1 is being rotated, the forming wheel reforms the teeth of the forming wheel by pressing into the teeth of the abrading wheel and powdered abrasive applied to the abrading wheel. The forming wheel rotates or rolls during this operation by reason of its frictional engagement with the wheel 1. As here shown, the forming wheel 33 is carried by links 34 pivoted at 35 to the frame, it being held firmly in engagement with the wheel 1 by an adjusting or clamping screw 36 mounted in a bracket 37 on the frame. When in operative position relatively to the wheel 1, the forming wheel 33 extends through the opening 15 in the casing 13. The forming wheel 33 is formed with a single spiral tooth and the abrading wheel 1 with a plural number of teeth here shown as four. The forming wheel is mounted to have an axial floating movement. The diameter of the abrading wheel is greater than that of the forming wheel 33 by the number of teeth on the abrading wheel times one or the number of teeth on the forming wheel. As in the illustrated embodiment of the invention, the abrading wheel has four spiral teeth, the diameter of the abrading wheel is four times that of the forming wheel. Also, because of the one to four arrangement, the forming wheel 33, which has an axial floating movement, will not feed axially in either direction under the rotative action of the abrading wheel 1. These are important features in the reforming operation of the teeth of the abrading wheel, as in operation, owing to these features and to the feature of the forming wheel being rotated by frictional engagement with the abrading wheel, the teeth of the abrading wheel, which are of relatively soft material, as lead, are quickly and accurately reformed to conform to the teeth of the forming wheel. During the lapping operation, the abrasive wears off or is pressed into the abrading wheel, which is of relatively soft material. In reforming the teeth of the abrading wheel, an abrasive powder is distributed on the periphery of the wheel, as the forming wheel builds up the abrading surfaces to their original form by pressing the abrasive into such faces and cause such faces to conform to the forming wheel.

What I claim is:

1. In a gear lapping machine, an abrading wheel formed with a spiral toothed working face, a spindle, a work gear support carried by the spindle and arranged to hold the gear with its teeth engaged with the teeth of the abrading wheel, the support including a shelf pivoted to the spindle on a transverse pivot and a lever pivoted to and overlying the shelf and so located that the work gear rests on the lever, a stud on the lever on which the gear is mounted, and a cam coacting with the lever to rock the same and to alternately press the work gear toward the abrading wheel and release the same from pressure toward the abrading wheel during the reciprocation of the spindle.

2. In a gear lapping machine, an abrading wheel formed with a spiral toothed working face, a spindle, a work gear support carried by the spindle and located to hold the gear with its teeth engaged with the teeth of the abrading wheel, means for rotating the abrading wheel, means for reciprocating the spindle, and means coacting with the gear support to impart to it a slight arcuate rocking movement during the reciprocation and the rotation of the work gear due to its meshing with the rotating abrading wheel including a spring tensioned to press the gear against the abrading wheel.

3. In a gear lapping machine, an abrading wheel formed with a spiral toothed working face, a spindle, a work gear support carried by the spindle and arranged to hold the gear with its teeth engaged with the teeth of the abrading wheel, the support including a shelf pivoted to the spindle on a transverse pivot and a lever pivoted to and overlying the shelf and so located that the work gear rests on the lever, a stud on the lever on which the gear is mounted, a cam coacting with the lever to rock the same and to alternately press the work gear toward the abrading wheel and release the same from pressure toward the abrading wheel during the reciprocation of the spindle, and a spring acting on the lever in a direction to press the gear toward the abrading wheel.

4. In a machine which includes an abrading wheel having peripheral, circumferentially extend abrading teeth formed of a material in which an abrasive can be charged or impregnated and a forming wheel which coacts with the toothed face of the abrading wheel to impress an abrasive thereinto, the forming wheel having teeth shaped to mesh with teeth in the abrading wheel and impress the abrasive thereinto and conform the teeth of the abrading wheel to those of the forming wheel during rotation of the abrading wheel, the forming wheel being mounted to have rolling contact with the abrading wheel and also to have a free, axial floating movement during its rotation.

5. In a machine which embodies an abrading wheel having peripheral, circumferentially extending abrading teeth formed of a material in which an abrasive can be charged or impregnated and a forming wheel which coacts with the toothed face of the abrading wheel to impress an abrasive thereinto, the forming wheel having teeth shaped to mesh with teeth in the abrading wheel and impress the abrasive thereinto and conform the teeth of the abrading wheel to those of the forming wheel during rotation of the abrading wheel, the forming wheel being mounted to have rolling contact with the abrading wheel and also to have a free, axial floating movement during its rotation, the abrading wheel having a plural number of teeth extending in a circumferential direction, the forming wheel having a single spiral tooth, the diameter of the abrading wheel being greater than that of the forming wheel by the plural number of teeth on the abrading wheel times one.

OSCAR C. KAVLE.